United States Patent
Knutsson et al.

(10) Patent No.: US 11,032,452 B2
(45) Date of Patent: Jun. 8, 2021

(54) CAMERA MODULE FOR A MOTOR VEHICLE

(71) Applicant: VEONEER SWEDEN AB, Vargarda (SE)

(72) Inventors: Per Knutsson, Linkoping (SE); Peter Fredriksson, Linkoping (SE)

(73) Assignee: VEONEER SWEDEN AB, Vargarda (SE)

( * ) Notice: Subject to any disclaimer, the term of this patent is extended or adjusted under 35 U.S.C. 154(b) by 12 days.

(21) Appl. No.: 16/099,528

(22) PCT Filed: May 10, 2017

(86) PCT No.: PCT/EP2017/061108
§ 371 (c)(1),
(2) Date: Nov. 7, 2018

(87) PCT Pub. No.: WO2017/194571
PCT Pub. Date: Nov. 16, 2017

(65) Prior Publication Data
US 2019/0166289 A1 May 30, 2019

(51) Int. Cl.
*H04N 5/225* (2006.01)
*G02B 7/00* (2021.01)
(Continued)

(52) U.S. Cl.
CPC ......... *H04N 5/22521* (2018.08); *G02B 7/008* (2013.01); *G02B 7/028* (2013.01);
(Continued)

(58) Field of Classification Search
CPC .................................................. H04N 5/22521
(Continued)

(56) References Cited

U.S. PATENT DOCUMENTS

| 5,614,763 A | 3/1997 | Womack |
| 8,090,250 B2 | 1/2012 | Lusinchi |

(Continued)

FOREIGN PATENT DOCUMENTS

| CN | 2896314 Y | 5/2007 |
| JP | 2004-147188 A | 5/2004 |
| WO | WO 2015/032512 A1 | 3/2015 |

OTHER PUBLICATIONS

International Search Report and Written Opinion of PCT/EP2017/061108, dated Jun. 13, 2017.
(Continued)

*Primary Examiner* — Joel W Fosselman
(74) *Attorney, Agent, or Firm* — Dickinson Wright PLLC

(57) ABSTRACT

A camera module (12) for a motor vehicle having a lens assembly (20), a housing (22) with a back plate (32) and a lens holder (53). The back plate (32) carries an image sensor (24) within the housing (22). The lens holder (53) is mounted to the back plate (32) and holds the lens objective (20) such that the image sensor (24) is arranged in or close to an image plane (A) of the lens objective (20). The back plate (32) is formed of at least one bi-material element (31) holding the image sensor (24). The bi-material element (31) having at least two layers (33, 34) of materials having significantly different thermal properties and being joined together such that the bi-material element (31) is adapted to bend with changing temperature.

15 Claims, 4 Drawing Sheets

(51) Int. Cl.
*G02B 7/02* (2021.01)
*B60Q 9/00* (2006.01)

(52) U.S. Cl.
CPC ......... *H04N 5/2253* (2013.01); *H04N 5/2254* (2013.01); *B60Q 9/008* (2013.01)

(58) Field of Classification Search
USPC ........................................................ 348/374
See application file for complete search history.

(56) References Cited

U.S. PATENT DOCUMENTS

| | | | |
|---|---|---|---|
| 9,297,978 B2 | 3/2016 | Kim | |
| 9,681,043 B2 | 6/2017 | Chen et al. | |
| 9,883,086 B2 | 1/2018 | Knutsson et al. | |
| 9,917,992 B2 | 3/2018 | Kim | |
| 10,054,757 B2 | 8/2018 | Knutsson et al. | |
| 10,451,832 B2 | 10/2019 | Wipperman et al. | |
| 2006/0092311 A1* | 5/2006 | Hartlove | G02B 7/08 348/340 |
| 2008/0278833 A1* | 11/2008 | Yuan | G02B 7/028 359/820 |
| 2010/0322610 A1 | 12/2010 | Lusinchi | |
| 2014/0029120 A1 | 1/2014 | Kim | |
| 2015/0326765 A1 | 11/2015 | Knutsson et al. | |
| 2016/0037023 A1 | 2/2016 | Chen et al. | |
| 2016/0173745 A1 | 6/2016 | Kim | |
| 2016/0202443 A1 | 7/2016 | Knutsson et al. | |
| 2017/0059808 A1 | 3/2017 | Wippermann et al. | |
| 2020/0018920 A1 | 1/2020 | Wippermann et al. | |

OTHER PUBLICATIONS

European Search Report and Opinion of EP 3244246 (B1) dated Oct. 31, 2016.

* cited by examiner

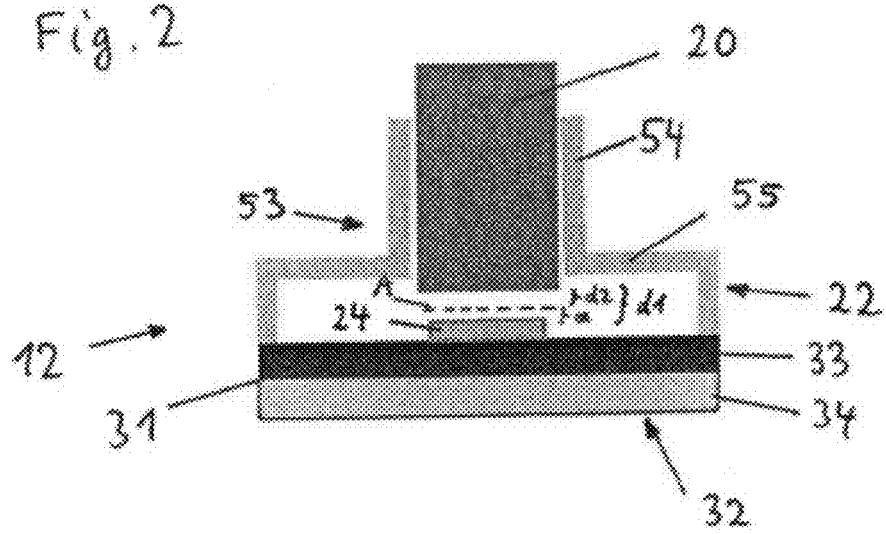
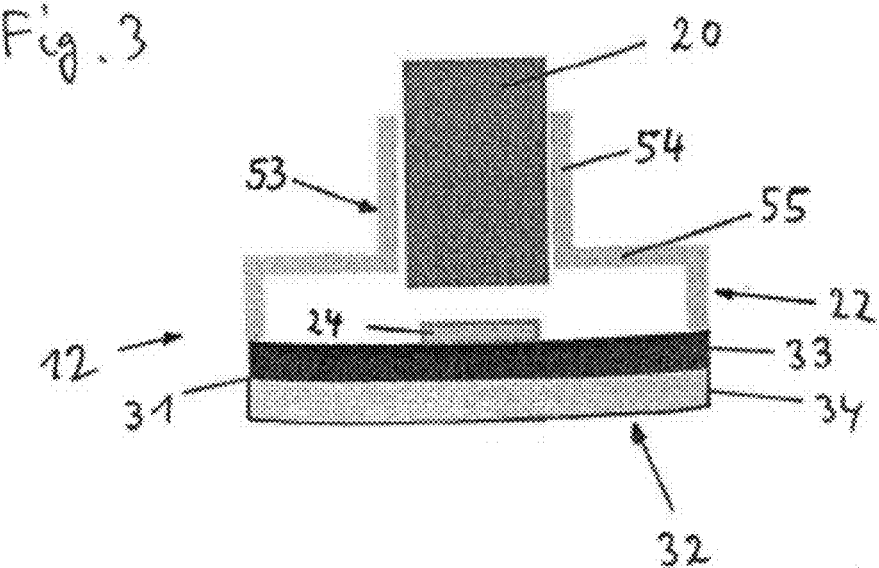

CAMERA MODULE FOR A MOTOR VEHICLE

CROSS-REFERENCE TO RELATED APPLICATIONS

This application is a 35 U.S.C. § 371 national phase of PCT International Application No. PCT/EP2017/061108, filed May 10, 2017, which claims the benefit of priority under 35 U.S.C. § 119 to European Patent Application No. 16169093.8, filed May 11, 2016, the contents of which are incorporated herein by reference in their entirety.

FIELD OF THE INVENTION

The invention relates to a camera module for a motor vehicle, having a lens objective, a housing having a back plate and a lens holder, wherein the back plate carries an image sensor within the housing, wherein the lens holder is mounted to—the back plate and holds the lens objective such that the image sensor is arranged in or close to an image plane of the lens objective.

BACKGROUND

Automotive camera modules are exposed to temperatures varying over a large range, and are required to have excellent imaging performance over the whole temperature range occurring in practice. Furthermore, automotive camera modules normally do not include an autofocusing mechanism for cost reasons. In many fixed-focus automotive camera modules, a major challenge is to retain the focus over the temperature envelope T. For low f/# lenses, the distance between the plane and the sensor must be controlled at a scale of micrometres.

Temperature differences lead to a respective change of the dimensions of the housing of the camera module. For instance, the height of the housing increases due to thermal expansion with an increase of the housing temperature. Accordingly, a distance between the lens objective, usually attached to a front end of the housing, and the image sensor, usually arranged at a back end of the housing, increases with a temperature increase, resulting in the sensor moving out of the image plane of the lens objective. Consequently, at high or very low temperatures the image sensor may not detect an image as clear as at moderate temperatures.

Therefore, for fixed focus cameras, there is a need to balance the image plane drift caused by the lens objective at largely varying temperatures; otherwise image sharpness will inevitably decrease under such conditions. Even more, since pixel size of image sensors is constantly being reduced, the image plane drift has to be controlled with increasing precision.

Solutions exist to control the image plane drift by introducing counter-acting mechanical elements in the camera module, so-called "athermalizers". For example, WO 2015/032512 A1 discloses an automotive camera module having a tube holding the lens objective, the tube being tuned to cancel the image plane drift. Although this solution is simple and reliable, the tube is an additional part which causes additional steps in the mounting of the camera module.

SUMMARY

The problem underlying the present invention is to provide a fast-to-mount camera module having a simple mechanism to keep the image sensor close to the image plane of the lens objective.

The invention solves this objective with the features described herein. The invention has realized that the thermal drift of the focus plane out of the image sensor plane can be counteracted at the back side of the camera module, namely by providing a bi-material element holding the image sensor and designed to bend with changing temperature. The bending action causes the image sensor to move, and this movement can be designed such that the image sensor, and with it the sensor plane, follows the thermal displacement of the image focus plane.

Preferably, therefore, the bi-material element is designed such that the bending of the bi-material element acts towards keeping the image plane in a predetermined positional relation to the image sensor, most preferably in the sensitive plane of the image sensor. Ideally the bending of the bi-material element holding the image sensor is tuned such that the image focus plane and the sensor plane are coinciding over the whole temperature range existing in automotive applications. Advantageously, the bi-material element is designed such that a thermal displacement of the bi-material element is able to compensate a thermal expansion of the lens holder and a shift of the image plane caused by changes of and within the lens objective.

The realization of the invention comprises different preferred aspects which shall be described in the following. Preferably the designing of the bi-material element includes one or more of; choosing the material of the layers to have different suited coefficients of thermal expansion; choosing the material of the layers to have suited elastic moduli; and/or choosing a suited geometry of the bi-material element, in particular a suited thickness of the layers.

In preferred embodiments of the present invention, the material of one or preferably both of the at least two layers is a metal. In particular, the bi-material element may be a bi-metal strip or plate. In these embodiments, the material of the layers may for example be based on iron, like steel, and/or be based on copper and/or tin, like brass.

In other preferred embodiments of the present invention, the layers are formed by layers of a sandwiched structure, like a PCB structure, having a metal layer, for example a copper layer, and a non-metal composite layer, like a glass fibre layer. In such embodiments, the bending properties of the plate may preferably be tuned by one or more of; adjusting the copper coverage in the copper layer of the sandwiched structure, for example in the form of a square grid; providing slits in at least one of the plate layers to mechanically decouple from the stiff lens holder; providing an inhomogeneous pattern in the metal layer, in particular in the copper layer, wherein the inhomogeneous pattern may preferably forms stripes in a preferred direction, a circular pattern, or combinations thereof.

The invention solves the above mentioned objective also with a camera module of the same kind, where instead of a bi-material element in the back plate, the back plate and the lens holder are made of materials having thermal properties and geometries and being connected together such that the back plate is adapted to bend with changing temperature. In this embodiment, the material, thickness and geometries of the back plate and the lens holder are combined to achieve the bi-material effect. Many preferred features described above with respect to the bi-material element in the back plate also apply for this embodiment in a corresponding manner. In particular, the back plate is designed and connected to the lens holder in such a manner such that the bending of the back plate acts towards keeping the image plane in a predetermined positional relation to the image sensor.

BRIEF DESCRIPTION OF THE DRAWINGS

In the following the invention shall be illustrated on the basis of preferred embodiments with reference to the accompanying drawings, wherein:

FIGS. 2, 3 schematically show an embodiment of the inventive camera module;

DETAILED DESCRIPTION

Figure 1:
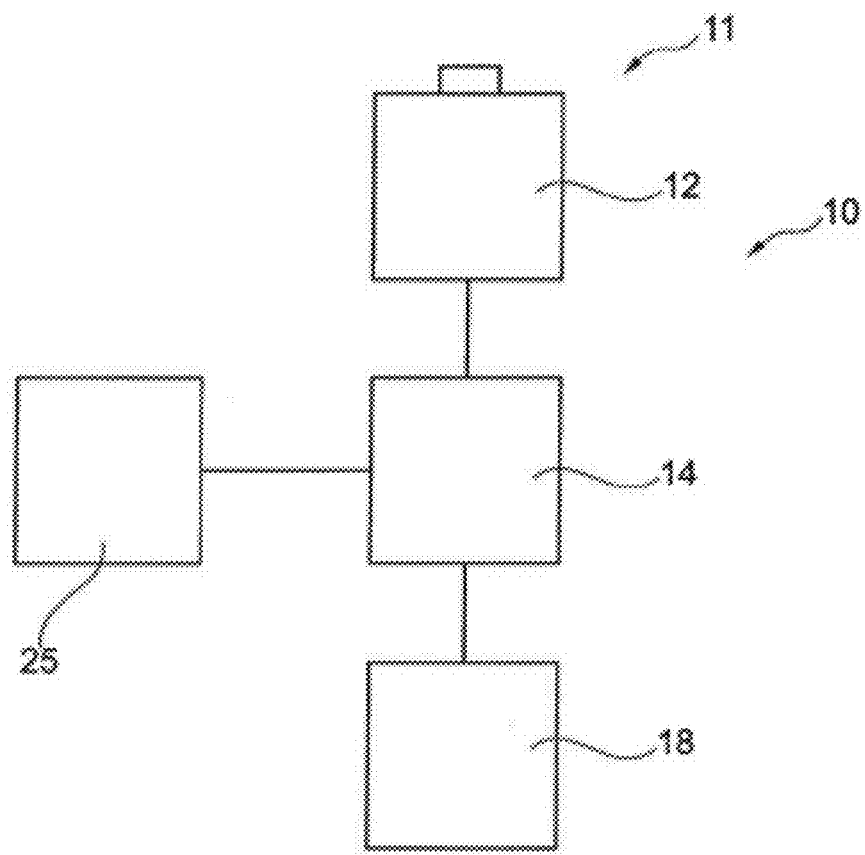
FIG. 1 schematically shows a vision system including the inventive camera module.

In FIG. 1 a vision system 10 is shown which is mounted in a motor vehicle (not shown) and includes an imaging apparatus 11 for acquiring images of a region surrounding the motor vehicle, for example a region in front of the motor vehicle. The imaging apparatus 11 includes one or more camera modules 12. The camera module 12 preferably operates in the visible wavelength region. In an alternative embodiment, the camera module 12 operates in the infrared wavelength region, where infrared covers near IR with wavelengths below 5 microns and/or far IR with wavelengths beyond 5 microns. In one embodiment, the imaging apparatus 11 includes a plurality of camera modules 12 in particular forming a stereo imaging apparatus 11. Alternatively, only camera module 12 forming a mono imaging apparatus 11 can be used.

The image data from the imaging apparatus 11 are provided to an electronic processing device 14 where image and data processing is carried out by corresponding software. In particular, the image and data processing in the processing device 14 providing the following functions: identification and classification of possible objects surrounding the motor vehicle, such as pedestrians, other vehicles, bicyclists or large animals; tracking over time the position of identified object candidates in the recorded images; calculation of a collision probability between the vehicle and a detected object; and/or activation or control of at least one driver assistance device 18 depending on the result of the object detection and tracking processing and/or the collision probability calculation. The driver assistance device 18 may include a display device for displaying information relating to a detected object; a warning device adapted to provide a collision warning to the driver by suitable optical, acoustical and/or haptical warning signals; one or more restraint systems such as occupant airbags or safety belt tensioners, pedestrian airbags, hood lifters and the like; and/or dynamic vehicle control systems such as brakes or steering device. The processing device 14 expediently has access to a memory device 25.

The data processing device 14 is preferably a digital device which is programmed or programmable and preferably may be a microprocessor, micro-controller, digital signal processor (DSP) or a System-On-Chip (SoC) device. The data processing device 14 and the memory device 25 are preferably realised in an on-board electronic control unit (ECU) and may be connected to the imaging apparatus 11 via a separate cable or a vehicle data bus. In another embodiment the ECU and one or more of the imaging devices 12 can be integrated into a single unit, where a one box solution including the ECU and all imaging devices 12 can be preferred. All steps from imaging, image processing to possible activation or control of driver assistance device 18 are performed automatically and continuously during driving in real time.

In FIG. 2 an embodiment of the inventive camera module 12 is schematically shown. The camera module 12 includes a lens objective 20, a housing 22 and an image sensor 24. The housing 22 comprises a lens holder 53 and a back plate 32 holding the image sensor 24. The housing 22 is basically closed in a light tight manner except for an opening 28 at a front end. The lens holder 53 includes a tubular part 54 holding the lens objective 20 and a base part 55 adapted to connect the lens holder 53 to the back plate 32. The tubular part 54 is preferably cylindrical and extends parallel to the optical axis of the lens objective 20.

Radiation or light from an image incidenting through the opening 28 is transmitted through the lens objective 20 held by the lens holder 53. The lens objective 20 focuses the image in the image plane A of the lens objective 20. The lens objective 20 and the sensitive plane of the image sensor 24 are arranged apart from each other with a predetermined distance d1, which ideally corresponds to the back focal distance of the lens objective 20 such that the image focus lies in the sensitive plane of the image sensor 24.

The image sensor 24 is preferably a two-dimensional image sensor, in particular an optical sensor having maximum sensitivity preferably in the visible wavelength region, and is adapted to convert incident light into an electrical signal containing image information of the image to be detected. As mentioned above, the image sensor 24 is advantageously arranged within the housing 22 in or close to the image plane A of the lens objective 20.

Preferably the lens holder 53 is made of a metal or a metal alloy, for example a zink alloy. In another embodiment, the lens holder 53 may be made of a polymer material, for example Polyphenylene sulphide (PPS). Further preferably the lens holder 53 is made of a reinforced plastic, in particular glass fiber and/or mineral powder reinforced plastics. A very preferred material for the lens holder 53 is PPS GM65, i.e. PPS with 65% glass fiber and mineral powder reinforcement.

The temperature dependent distance a(T) between the image plane A and the sensitive surface of the sensor 24 is determined by two parameters, see FIG. 2. The first is the temperature dependent distance d1(T) between the lens objective 20 and the sensitive surface of the sensor 24. The second is the distance d2(T) between the lens objective 20 and the image plane A which varies over temperature due to mechanical displacements in the lens objective 20, change in refractive index of the optical elements or lenses in the lens objective 20, dimensional changes within the lens objective 20, etc. The image position A relative to the sensor 24 is then given by a(T)=d1(T)−d2(T). Ideally, the image plane shall always coincide with the sensor surface, i.e. a(T)=0, such that d1(T)=d2(T).

Figure 4:
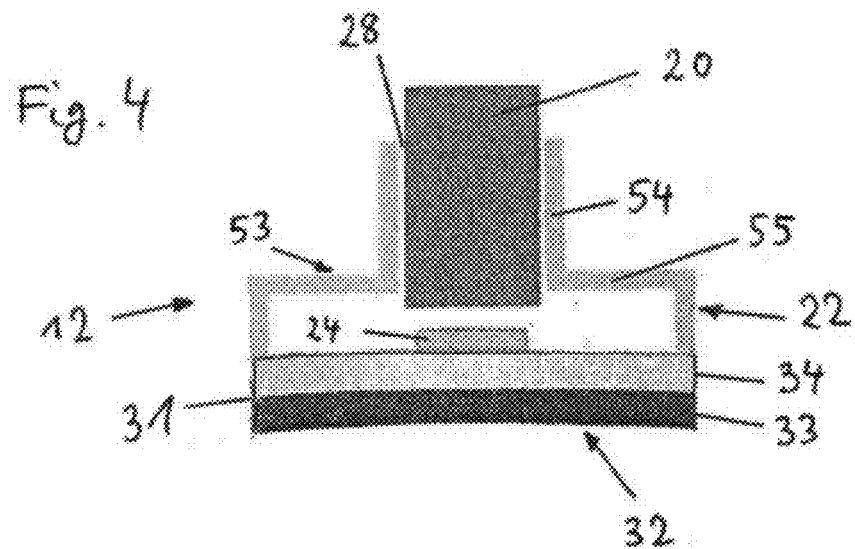
FIG. 4 schematically shows an inventive camera module in another embodiment.

In order to achieve this, the image sensor 24 is mounted on a bi-material element 31 which is preferably planar and has the form of a plate or strip. In particular, the bi-material element 31 can form the back plate 32, be part of the back plate 32 or be mounted on the back plate 32. The image sensor 24 is preferably mounted in the center of the bi-material element 31 in a longitudinal direction, as shown in FIGS. 2 to 4. The bi-material element 31 is formed of at least two layers 33, 34 made of different materials having significantly different coefficients of thermal expansion (CTE) and connected to each other in a manner (for example along opposing edges of the bi-material element 31) such that the bi-material element 31 bends with changing temperature.

In one embodiment, the layers 33, 34 may be made of metal, for example an iron based layer 33 like steel, and a copper and/or tin based layer 34 like brass. In another embodiment, the layers 33, 34 may be the layers of a sandwiched PCB structure, in particular a copper layer and a glass fiber layer.

The materials of the plate layers 33, 34 are duly chosen such that the above equation d1(T)=d2(T) is fulfilled over the temperature range occurring in the operation of a motor vehicle. In the embodiment of FIG. 2 and FIG. 3 the plate 33 of material having the lower CTE is facing towards the lens objective 20 and carries the image sensor 24, whereas the plate 34 of material having the higher CTE is arranged at the outer side of the camera module 23 facing away from the lens objective 20. In such embodiments the bi-material element 31 bends outwards in a convex manner, i.e. away from the lens objective 20, with rising temperature. For example, FIG. 2 shows a planar state of the bi-material element 31 at a reference temperature, and FIG. 3 shows a bent state of the bi-material element 31 at a temperature significantly higher than the reference temperature. Since the lens holder 53 expands with rising temperature (no solid materials are known which contract with rising temperature), this embodiment may be beneficial in case where downward movement of the image plane A with rising temperature caused by effects in the lens objective 20 dominates over contraction of the lens holder 53.

In the embodiment of FIG. 4 the plate 33 of material having the lower CTE is arranged at the outer side of the camera module 23 facing away from the lens objective 20, whereas the plate 34 of material having the higher CTE is facing towards the lens objective 20 and carries the image sensor 24. In other words, the arrangement of the layers 33, 34 is vice versa as compared to FIGS. 2 and 3. In such embodiments the bi-material element 31 bends inwards in a concave manner, i.e. towards the lens objective 20, with rising temperature. This embodiment may be beneficial in case the expansion of the lens holder 53 is dominating over the movement of the image plane A caused by effects in the lens objective 20.

Figure 5:
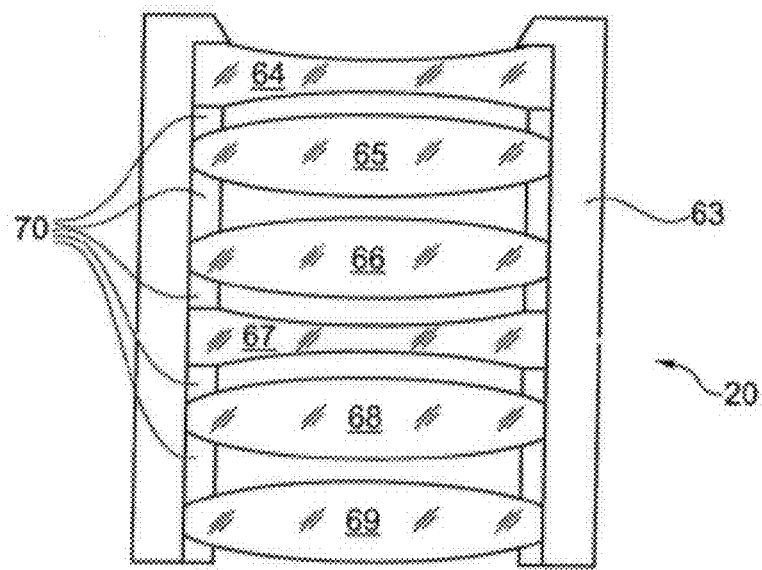
FIG. 5 shows a schematic cross-sectional view of a lens objective for use in an inventive camera module.

The lens objective 20 includes a lens barrel 63 and one or more lenses 64 to 69 held inside the lens barrel 63 and spaced from each other using ring shaped spacers 70, see FIG. 5. The lens barrel 63 and the spacers 70 are preferably made of metal, in particular brass. The lenses 64 to 69 may be provided in the form of convex lenses 65, 66, 68, 69 and concave lenses 64, 67. The outer shape of the lens barrel 63 is generally cylindrical and closely fits the inner cylindrical shape of the tubular part 24 such that the lens objective 20 is closely guided in the tubular part 24.

There is no requirement that a practical embodiment of the invention is in the form of a state with plane or even bi-material element 31 as shown in FIG. 2. In particular, a practical embodiment of the invention may be designed such that the bi-material element 31 changes between a less convex bent state and largely convex bent state, or between a less concave bent state and largely concave bent state. That is, the bi-material element 31 may be bent in one direction over the whole temperature range occurring in automobile operation.

Figure 6:
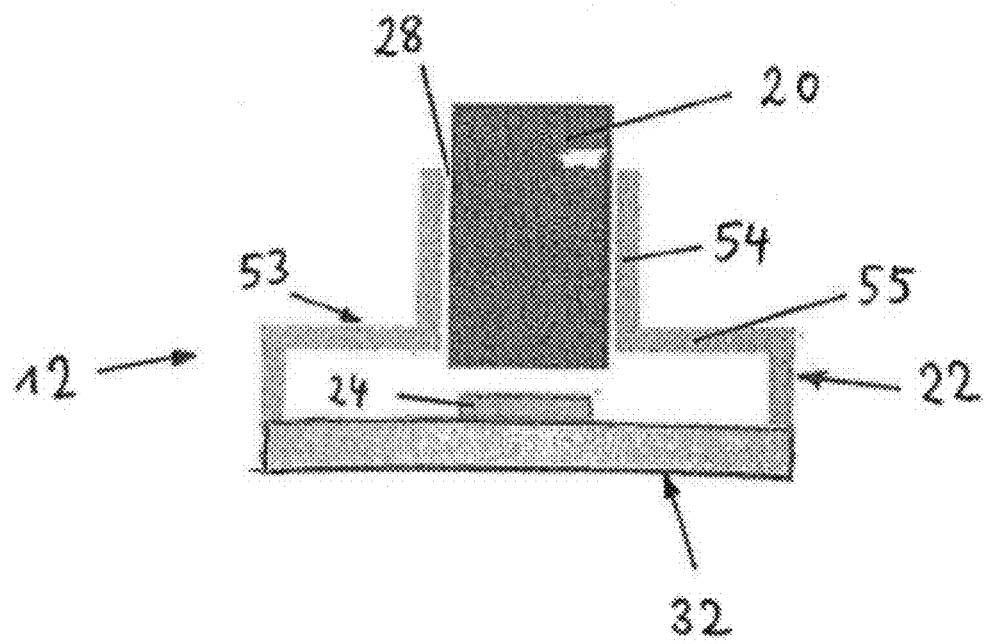
FIG. 6 schematically shows an inventive camera module in a further embodiment.

FIG. 6 shows an embodiment where the back plate 32 is made of a material, form and thickness which leads to a bending of the back plate 32 here towards the lens objective 20 when the temperature rises, such that the image sensor 24 mounted on the back plate 32 moves towards the lens objective 20 with rising temperature. In particular, the back plate 32 may be made of a material having significantly different thermal properties, in particular a higher CTE, as compared to the material of the lens holder 53. Therefore, in this embodiment, the desired bi-material effect is achieved through the connection of the back plate 32 to the lens holder 53, whereas no thermal bending is required in the back plate 32 on its own, i.e. when disconnected from the lens holder 53.

While the above description constitutes the preferred embodiment of the present invention, it will be appreciated that the invention is susceptible to modification, variation and change without departing from the proper scope and fair meaning of the accompanying claims.

The invention claimed is:

1. A camera module for a motor vehicle, comprising; a lens objective, a housing having a back plate and a lens holder, wherein the back plate carries an image sensor within the housing, wherein the lens holder is mounted to the back plate and holds the lens objective such that the image sensor is arranged in or close to an image plane of the lens objective, the back plate comprises at least one bi-material element holding the image sensor, the bi-material element formed of at least two layers of materials having different thermal properties and being connected together such that the bi-material element is adapted to bend with changing temperature, wherein the bending behavior of the bi-material element formed in the back plate changes the spacing between the image sensor and the lens objective, and wherein the lens holder is made of materials having thermal properties and an end of the lens holder is directly attached to the bi-material element such that a thermal displacement of the bi-material element is able to compensate a thermal expansion of the lens holder and a shift of the image plane caused by changes of and within the lens objective.

2. The camera module as claimed in claim 1 further comprising, bending of the bi-material element acts towards keeping the image plane in a predetermined positional relation to the image sensor.

3. The camera module as claimed in claim 2 further comprising, the materials of the layers of the bi-material element have different coefficients of thermal expansion.

4. The camera module as claimed in claim 2 further comprising, the materials of the layers of the bi-material element have elastic moduli.

5. The camera module as claimed in claim 2 further comprising, the bi-material element is formed with a geometry of the bi-material element.

6. The camera module as claimed in claim 5 wherein, the geometry of the bi-material element is chosen with a thickness of the layers.

7. The camera module as claimed in claim 1 further comprising, the bi-material element to bend away from the lens objective with rising temperature.

8. The camera module as claimed in claim 1 further comprising, the bi-material element is adapted to bend towards the lens objective with rising temperature.

9. The camera module as claimed in claim 1 further comprising, in that the material of at least one of the at least two layers is a metal.

10. The camera module as claimed in claim 1 further comprising, in that the layers are formed by layers of a sandwiched structure, including a metal layer, and a non-metal composite layer.

11. The camera module as claimed in claim 10 further comprising, the metal layer formed of copper and in that the bending properties of the bi-material element are tuned by adjusting a copper coverage in the metal layer of the sandwiched structure in the form of a square grid.

12. The camera module as claimed in claim 10 further comprising, in that the bending properties of the bi-material element are tuned by providing slits in at least one of the layers to mechanically decouple from the lens holder.

13. The camera module as claimed in claim 10 further comprising, that the bending properties of the bi-material element are tuned by providing an inhomogeneous pattern in the metal layer, wherein the inhomogeneous pattern comprises stripes in a direction, a circular pattern, or combinations thereof.

14. A camera module for a motor vehicle, comprising; a lens objective, a housing having a back plate and a lens holder, wherein the back plate carries an image sensor within the housing, wherein the lens holder is mounted to the back plate and holds the lens objective such that the image sensor is arranged in or close to an image plane of the lens objective, the back plate comprises at least one bi-material element holding the image sensor, the bi-material element formed of at least two layers of materials having different thermal properties and being connected together such that the bi-material element is adapted to bend with changing temperature, wherein the layers are formed by layers of a sandwiched structure, including a metal layer, and a non-metal composite layer, and wherein the metal layer is formed of copper and the bending properties of the bi-material element are tuned by adjusting a copper coverage in the metal layer of the sandwiched structure in the form of a square grid.

15. A camera module for a motor vehicle, comprising; a lens objective, a housing having a back plate and a lens holder, wherein the back plate carries an image sensor within the housing, wherein the lens holder is mounted to the back plate and holds the lens objective such that the image sensor is arranged in or close to an image plane of the lens objective, the back plate comprises at least one bi-material element holding the image sensor, the bi-material element formed of at least two layers of materials having different thermal properties and being connected together such that the bi-material element is adapted to bend with changing temperature, wherein the layers are formed by layers of a sandwiched structure, including a metal layer, and a non-metal composite layer, wherein the bending properties of the bi-material element are tuned by providing an inhomogeneous pattern in the metal layer, and wherein the inhomogeneous pattern comprises stripes in a direction, a circular pattern, or combinations thereof.

* * * * *